United States Patent
LeCrone et al.

(10) Patent No.: US 11,789,635 B2
(45) Date of Patent: Oct. 17, 2023

(54) COPYING DATA BETWEEN STORAGE SYSTEMS

(71) Applicant: EMC IP Holding Company LLC, Hopkinton, MA (US)

(72) Inventors: Douglas E. LeCrone, Hopkinton, MA (US); Denis J. Burt, Plymouth, MA (US); Brett A. Quinn, Lincoln, RI (US); Paul A. Linstead, Shrewsbury, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/160,465

(22) Filed: Jan. 28, 2021

(65) Prior Publication Data
US 2022/0236881 A1 Jul. 28, 2022

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 7,263,590 B1* | 8/2007 | Todd | ..................... | G06F 16/214 711/161 |
| 9,400,611 B1* | 7/2016 | Raizen | ................ | H04L 67/1097 |
| 2011/0066819 A1* | 3/2011 | Mashtizadeh | ......... | G06F 3/0617 711/E12.001 |
| 2017/0031830 A1* | 2/2017 | Bk | ........................ | G06F 3/0656 |
| 2017/0060710 A1* | 3/2017 | Ramani | ............... | G06F 11/2069 |
| 2018/0284995 A1* | 10/2018 | Dantkale | ............. | G06F 12/0868 |
| 2018/0285223 A1* | 10/2018 | McBride | ............. | G06F 11/2094 |
| 2019/0391878 A1* | 12/2019 | Mark | .................. | G06F 11/1458 |

* cited by examiner

*Primary Examiner* — Prasith Thammavong
*Assistant Examiner* — Edmund H Kwong
(74) *Attorney, Agent, or Firm* — Muirhead and Saturnelli, LLC

(57) ABSTRACT

Copying data from a source storage system to a target storage system includes resetting a write tracker on the source storage system to track writes to the source storage system by one or more host computing systems, copying data from the source storage system to the target storage system after resetting the write tracker, suspending writes to the source storage system after copying the data, and copying data portions of the source storage system to the target storage system that are indicated as being written by the write tracker after suspending writes to the source storage system. Applications that write data to the source storage system may be quiesced in connection with suspending writes to the source storage system. Data portions may be repeatedly copied from the source storage system to the target storage system until an end condition is reached.

20 Claims, 6 Drawing Sheets

COPYING DATA BETWEEN STORAGE SYSTEMS

TECHNICAL FIELD

This application relates to the field of computer systems and storage systems therefor and, more particularly, to the field of transferring data between storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

In some instances, it may be desirable to copy data from one storage system to another. For example, when a new storage system is installed, data may be copied from an old storage system to the new storage system prior to switching over to the new storage system and decommissioning the old storage system. One way to move the data is to suspend all host access to the old storage system, perform a batch copy operation using, for example, an IBM ADRDSSU volume copy batch command to copy the data from the old (source) storage system to the new (target) storage system and then reenable host access using the new storage system. This is a fairly reliable way to ensure that the new storage system accurately contains all of the data of the old storage system. However, in some cases, the amount of data may cause the copy operation to take a number of hours and, in extreme cases, a number of days. Suspending the host for this amount of time may be unacceptable in many situations.

In instances where suspending the host for an extended period of time is unacceptable, there are solutions that allow host access to the source storage system while data is being copied from the source storage system to the target storage system. However, these 'non-disruptive' solutions are relatively complex and error prone because data is being copied from a source storage system at the same time the host is writing data to the source storage system. Also, some of these solutions adversely interact with disaster recovery in a way that may either require suspending writes for a relatively long time while the data is migrated or causing an inconsistency of the data at a disaster recovery site, both of which are unacceptable.

Accordingly, it is desirable to be able to copy data from a source storage system to a target storage system without suspending a host for extended periods of time and without impacting any disaster recovery system that protects the data at the source storage system and it is desirable to provide optimizations that minimize disruption to the host to a very short period of time that is a small fraction of the time required to migrate the data.

SUMMARY OF THE INVENTION

According to the system described herein, copying data from a source storage system to a target storage system includes resetting a write tracker on the source storage system to track writes to the source storage system by one or more host computing systems, copying data from the source storage system to the target storage system after resetting the write tracker, suspending writes to the source storage system after copying the data, and copying data portions of the source storage system to the target storage system that are indicated as being written by the write tracker after suspending writes to the source storage system. Applications that write data to the source storage system may be quiesced in connection with suspending writes to the source storage system. Copying data from the source storage system may use job control language to indicate which data is to be copied. Data portions may be repeatedly copied from the source storage system to the target storage system until an end condition is reached. The end condition may be an amount of data that is to be recopied from the source storage system to the target storage system, an amount of time used for copying the data, or a target completion time. A remote storage system may receive replicated data from the source storage system. The remote storage system may receive replicated data from the target storage system after all data has been copied from the source storage system to the target storage system. Data may be copied using a generic copy utility that does not otherwise handle data being modified during a copy operation. At least one host may be coupled to the source storage system and the target storage system. The at least one host may be used to copy data from the source storage system to the target storage system.

According further to the system described herein, a non-transitory computer readable medium contains software that, when executed, copies data from a source storage system to a target storage system. The software includes executable code that resets a write tracker on the source storage system to track writes to the source storage system by one or more host computing systems, executable code that copies data from the source storage system to the target storage system after resetting the write tracker, executable code that suspends writes to the source storage system after copying the data, and executable code that copies data portions of the source storage system to the target storage system that are indicated as being written by the write tracker after suspending writes to the source storage system. Applications that write data to the source storage system may be quiesced in connection with suspending writes to the source storage system. Copying data from the source storage system may use job control language to indicate which data is to be copied. Data portions may be repeatedly copied from the source storage system to the target storage system until an end condition is reached. The end condition may be an amount of data that is to be recopied from the source storage system to the target storage system, an amount of time used for copying the data, or a target completion time. A remote storage system may receive replicated data from the source storage system. The remote storage system may receive replicated data from the target storage system after all data has been copied from the source storage system to the target storage system. Data may be copied using a generic copy utility that does not otherwise handle data being modified during a copy operation. At least one host may be coupled to the source storage system and the target storage system. The at least one host may be used to copy data from the source storage system to the target storage system.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein facilitates a transition from a source storage system to a target storage system while the source storage system is still interacting with and receiving writes from a host. Writes by the host to the source storage system are tracked while data is being copied from the source storage system to the target storage system. On each subsequent iteration, data corresponding to portions of the source storage system that were written by the host during a prior copy operation is copied to the target storage system.

Figure 1:
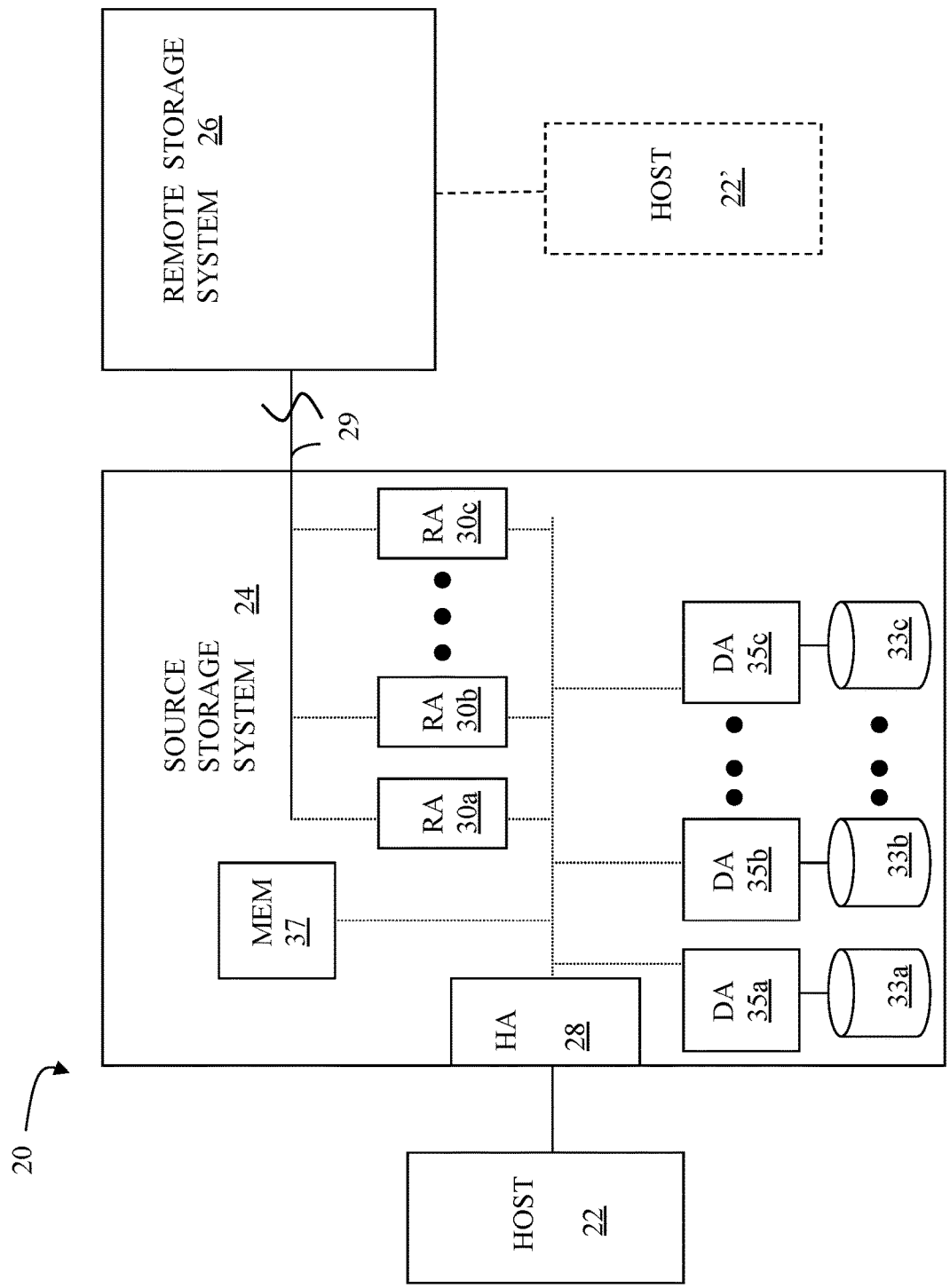
FIG. 1 is a schematic illustration showing a relationship between hosts and storage systems according to an embodiment of the system described herein.

FIG. 1 is a diagram 20 showing a relationship between a host 22 and a source storage system 24 that may be used in connection with an embodiment of the system described herein. In an embodiment, the source storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the source storage system 24 and may, in various embodiments, be coupled to the source storage system 24, using, for example, a network. The host 22 reads and writes data from and to the source storage system 24 via an HA 28 (host adapter), which facilitates an interface between the host 22 and the source storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the source storage system 24 may be copied to the remote storage system 26 via a link 29. For example, transferring data may be part of a data mirroring or replication process that causes data on the remote storage system 26 to be identical to the data on the remote storage system 24. Although only the one link 29 is shown, it is possible to have additional links between the storage systems 24, 26 and to have links between one or both of the storage systems 24, 26 and other storage systems (not shown). The source storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The source storage system 24 may include one or more physical storage units (including disks, solid state storage devices, etc.), each containing a different portion of data stored on the source storage system 24. FIG. 1 shows the source storage system 24 having a plurality of physical storage units 33a-33c. The source storage system 24 (and/or remote storage system 26) may be provided as a stand-alone device coupled to the host 22 as shown in FIG. 1 or, alternatively, the source storage system 24 (and/or remote storage system 26) may be part of a storage area network (SAN) that includes a plurality of other storage systems as well as routers, network connections, etc. (not shown in FIG. 1). The storage systems 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the source storage system 24. Note that, in other embodiments, it is possible for more than one physical storage unit to be serviced by a DA and that it is possible for more than one DA to service a physical storage unit. The source storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the source storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the source storage system 24, operation may resume at a remote site containing the remote storage system 26 and the other host 22'. In some cases, the host 22 may be directly coupled to the remote storage system 26, thus protecting from failure of the source storage system 24 without necessarily protecting from failure of the host 22.

Figure 2:
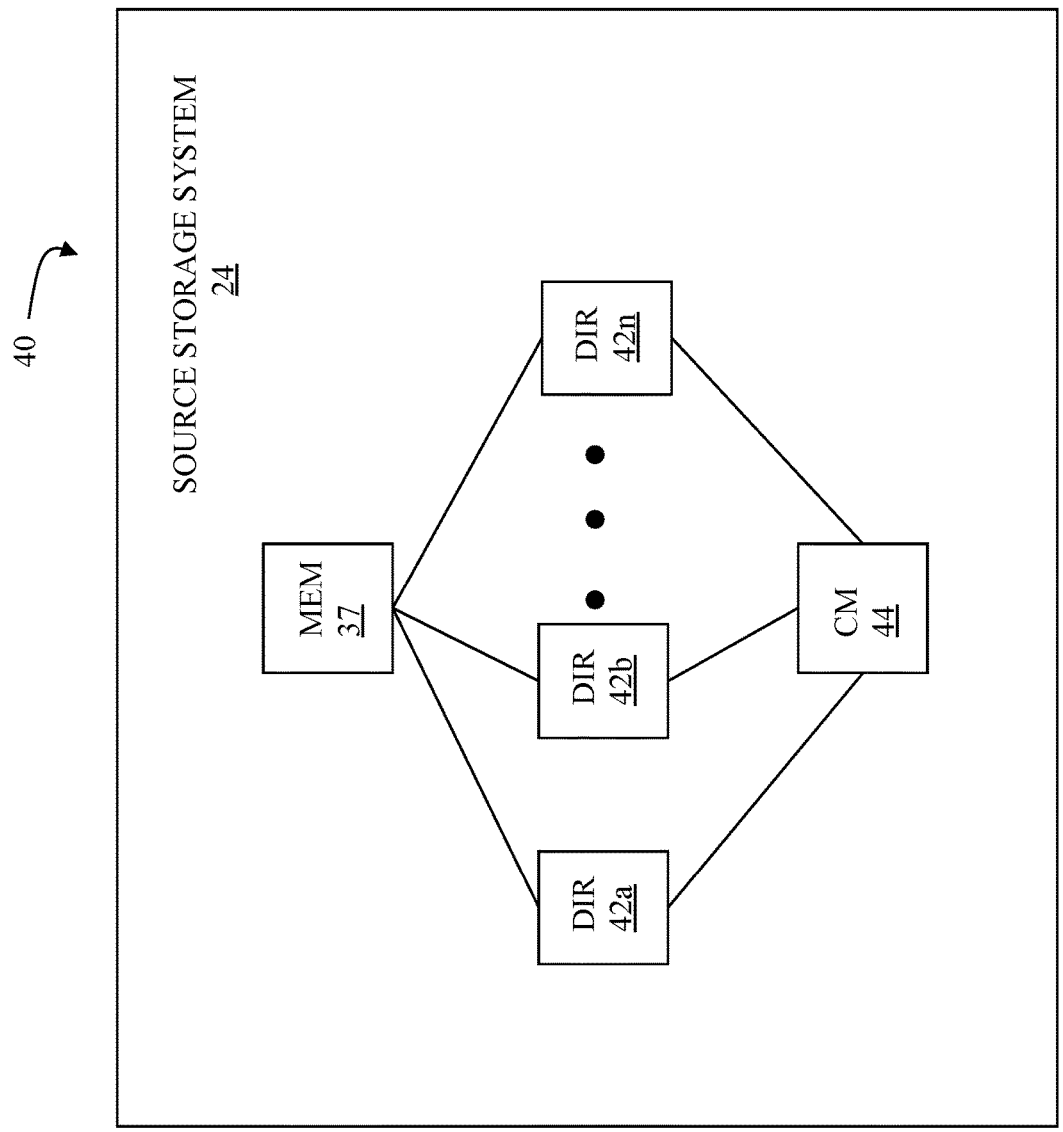
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the source storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the source storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
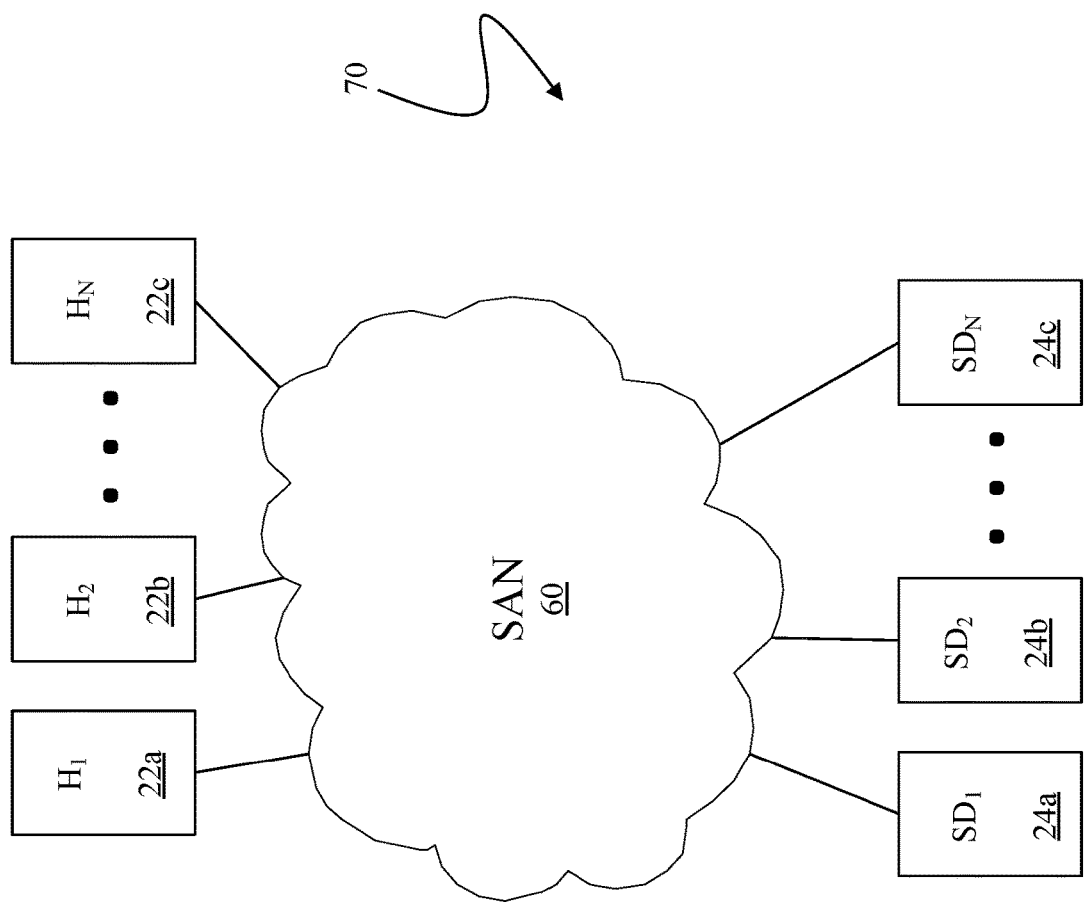
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
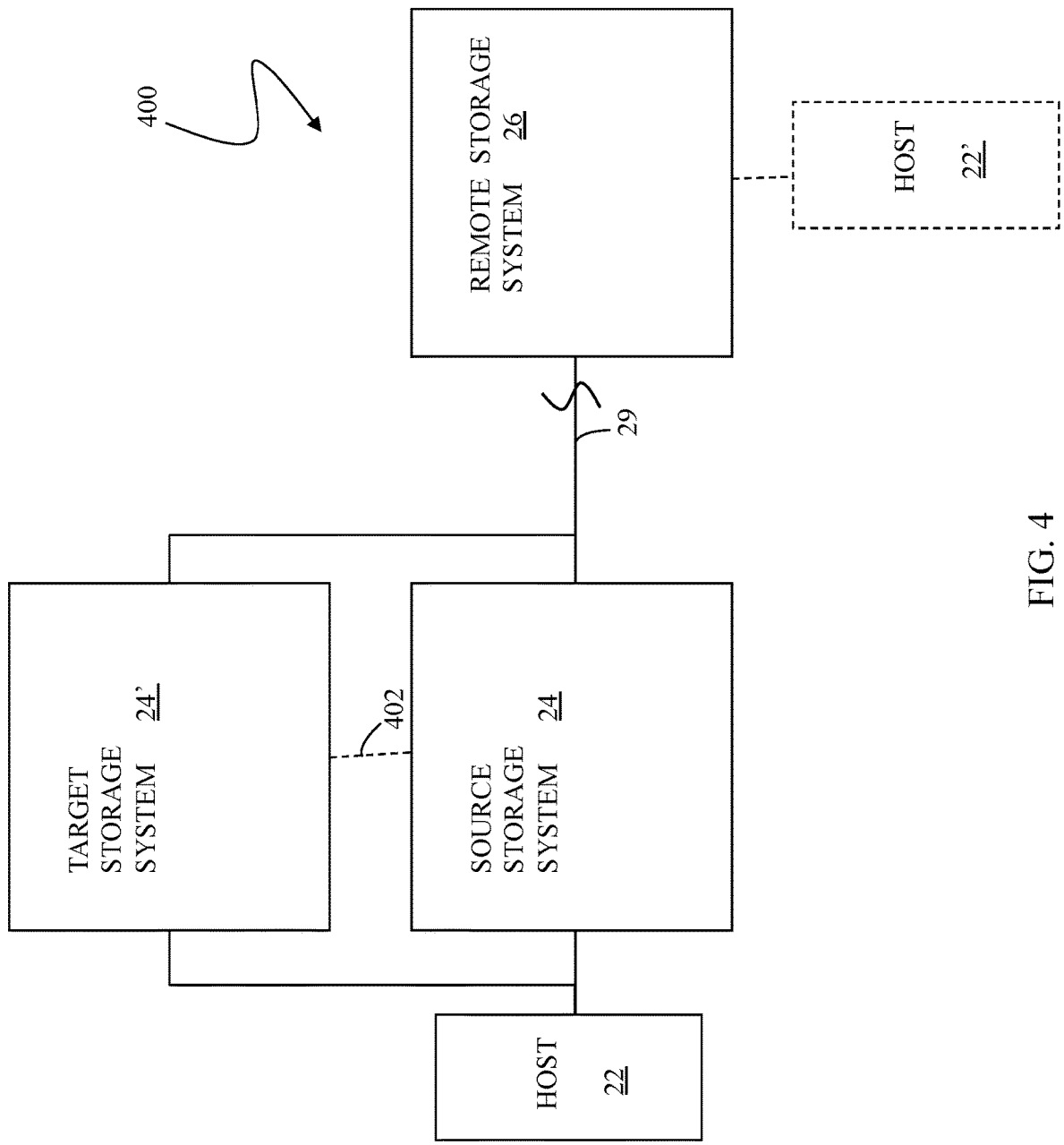
FIG. 4 is a schematic illustration showing a relationship between hosts, a source storage system, a target storage system, and a remote storage system according to an embodiment of the system described herein.

Referring to FIG. 4, a diagram 400 shows the host 22, the source storage system 24, the remote storage system 26, the link 29, and the remote host 22', all of which are discussed above. The diagram 400 also shows a target storage system 24' that will replace the source storage system 24 after all of the data from the source storage system 24 is copied to the target storage system 24'. In an embodiment, the target storage system 24' may be a PowerMax, Symmetrix, or VMAX storage system produced by Dell EMC of Hopkinton, Mass.; however, the system described herein may operate with other appropriate types of storage systems.

The host 22 communicates directly with the target storage system 24' to exchange data therewith. Similarly, the target storage system 24' accesses the link 29 (or possibly a different link) to provide data to the remote storage system 26. The remote storage system 26 may provide disaster recovery (DR) functionality for the source storage system 24 and, subsequently, provide DR functionality for the target storage system 24'. The DR functionality may be provided by having the source storage system 24 replicate data to the remote storage system 26 and, following switching to the target storage system 24', having the target storage system 24' replicate data to the remote storage system 26. The source storage system 24 may represent an existing storage system and the target storage system 24' may represent a new storage system that is replacing the source storage system 24 after copying all of the data from the source storage system 24 to the target storage system 24'. In some embodiments, the target storage system 24' may provide remote replication to a different remote storage system separate from the remote storage system 26.

In an embodiment herein, data may be copied from the source storage system 24 to the target storage system 24' using the host 22 to read data from the source storage system 24 and write the data to the target storage system 24'. In other embodiments, data may be transferred directly from the source storage system 24 to the target storage system 24' via a direct link 402 between the storage systems 24, 24'. Thus, the discussion herein regarding transferring data includes any appropriate mechanism for transferring data from the source storage system 24 to the target storage system 24', including via the host 22 and via the direct link 402.

Figure 5:
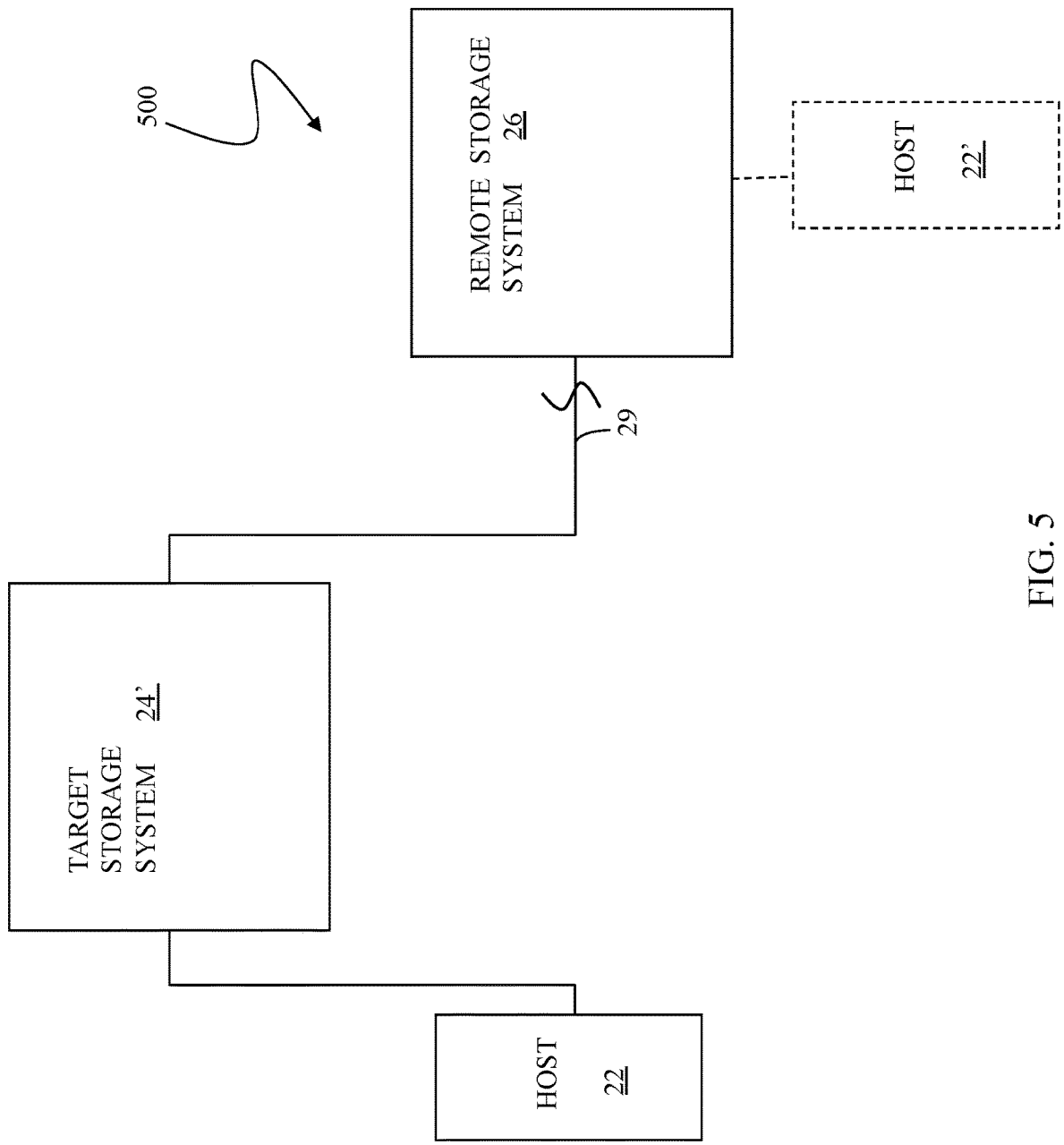
FIG. 5 is a schematic illustration showing a relationship between hosts, a source storage system, and a remote storage system according to an embodiment of the system described herein.

Referring to FIG. 5, a diagram 500 shows the host 22, the target storage system 24', the remote storage system 26, the link 29, and the remote host 22'. The diagram 500 represents a state of the system after all of the data has been copied to the target source system 24' and the source storage system 24 has been removed. The host 22 exchanges data with the target storage system 24' in a manner similar to previously exchanging data with the source storage system 24 (not shown in FIG. 5). Similarly, the target storage system 24' provides data to the remote storage system 26 in a manner similar to how the source storage system 24 had provided data to the remote storage system 26. In effect, the target storage system 24' replaces the source storage system 24.

Figure 6:
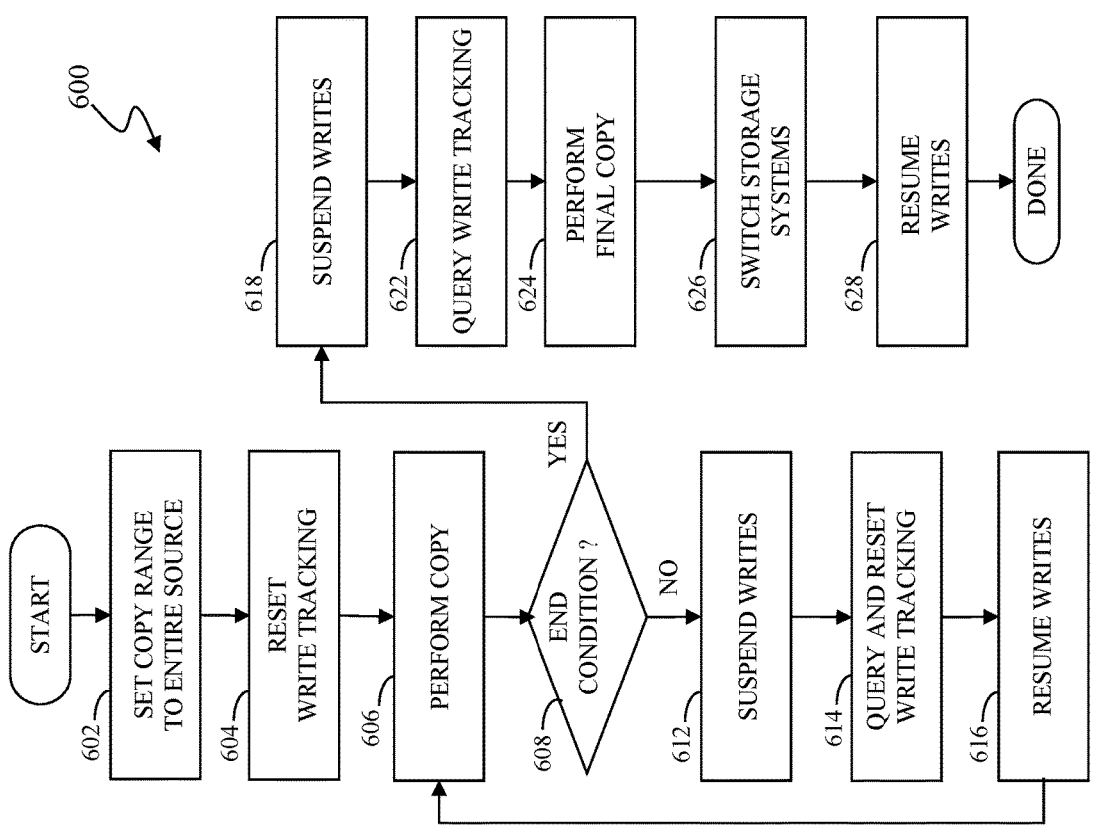
FIG. 6 is a flow diagram illustrating processing performed in connection with copying data from a source storage system to a target storage system according to an embodiment of the system described herein.

Referring to FIG. 6, a flow diagram 600 illustrates processing performed in connection with transferring data from the source storage system 24 to the target storage system 24' and then switching to use the target storage system 24' as shown in the diagram 500 of FIG. 5. The processing illustrated by the flow diagram 600 may run on the host 22 if the host is performing data copying. Alternatively, the processing illustrated by the flow diagram 600 may run on a combination of the host 22 and different device(s) that are performing the copy operation, such as the source storage system 24 if the source storage system 24 is transferring data using the direct link 402, discussed above. Note also that the system described herein may include multiple hosts that are writing data to the source storage system 24, and thus the processing or portions thereof illustrated by the flow diagram 600 may run on one or more of the multiple hosts.

Processing begins at a first step 602 where the system sets a range of data on the source storage system 24 to be copied. In an embodiment herein, the system uses a generic copy utility, such as BMC's FDR utilities or IBM's ADRDSSU or DSS utilities, that do not otherwise handle data being modified during a copy operation. In some instances, the mechanism used for copying data is executed via Job Control Language (JCL) commands. At the step 602, the system sets up JCL commands to copy the entirety of the source storage system 24 or at least a portion of data on the source storage system 24 that is being preserved. That is, in some cases, only some of the data source storage system 24 may be transferred to the target storage system 24' while the remaining data may be discarded in connection with the transfer and swap.

Following the step 602 is a step 604 where tracking for data writes to the source storage system 24 is reset (initialized). The system tracks data writes by the host 22 to the source storage system 24 while data is being copied from the source storage system 24 to the target storage system 24'. Any data portion (track, block, extent, etc.) that is written by the host 22 to the source storage system 24 while data is being copied from the source storage system 24 to the target storage system 24' is assumed to be modified and thus will need to be copied again. This is described in more detail elsewhere herein. Any appropriate mechanism may be used to track data writes, such as the SDDF mechanism provided by Dell EMC or the Write Monitor feature provided by IBM Corporation. Following the step 604 is a step 606 where data is copied from the source storage system 24 to the target storage system 24'. Any appropriate copy mechanism may be used at the step 606, including copy mechanisms that otherwise rely on writes having been suspended to the source storage system 24. For example, the ADRDSSU, DSS or FDR copy mechanisms may be used at the step 606. In this case, writes from the host 22 to the source storage system 24 do not need to be suspended but, instead, continue as the copy operation is being performed at the step 606.

Following the step 606 is a test step 612 where it is determined if an end condition has been reached. In an embodiment herein, the copy operation is deemed completed based on an amount of data that is to be recopied from the source storage system 24 to the target storage system 24'. Note that the write tracking initiated at the step 604 keeps track of the portions of data at the source storage system 24 that were modified (written) by the host 22 during the copy operation at the step 606 so that the amount of data that is to be recopied is the amount of data indicated by the write tracker that was written by the host 22 during a previous copy operation. Thus, for example, the test at the step 608 could determine if five percent or less of a total amount of the data was modified during the previous copy operation at the step 606. Other end conditions are possible, including an amount of time used for the copy operation or a target completion time. In some embodiments, only one iteration of the copy operation at the step 606 is performed, which effectively is the same as the result of the test at the step 608 always being true (i.e., the end condition is always reached).

If it is determined at the test step 608 that an end condition has not been reached, then control passes from the test step 608 to a step 612 where writes to the source storage system 24 by the host 22 (or possibly multiple hosts) are suspended. The suspension at the step 612 is only for the relatively short period of time needed to perform a next step 614 where the write tracker is queried (to determine which portions of the source storage system 24 were written during the copy operation at the step 606) and is also reset to begin tracking a new set of write operations. In some instances, applications that write to the storage system 24 may also be quiesced while writes are suspended. The query at the step 614 also sets up JCL commands to copy data from the source storage system 24 to the target storage system 24'. Unlike the JCL command setup at the step 602, described above, the JCL commands set up at the step 614 only cause copying of data indicated by the tracking mechanism as having been modified by the host 22 during the copy operation at the step 606. That is, the only data that needs to be copied following the step 606 is data at the source storage system 24 that was modified (written) by the host 22 during the copy operation at the step 606.

Following the step 614 is a step 616 where writes by the host 22 to the source storage system 24 are resumed. Note that the amount of time that writes to the source storage device 24 are suspended is relatively short and corresponds to an amount of time needed to query and reset write tracking. Following the step 616, control transfers back to the step 606, discussed above, for another iteration.

If it is determined at the test step 608 that an end condition has been reached, then control transfers from the step 608 to a step 618 where writes to the source storage system 24 by the host 22 (or possibly multiple hosts) are suspended. In some instances, applications that write to the storage system 24 may also be quiesced while writes are suspended. Following the step 618 is a step 622 where the write tracker is queried to determine which portions of the source storage system 24 were written during the copy operation at the step 606. The query at the step 622 also sets up JCL commands to copy data from the source storage system 24 to the target storage system 24'. Unlike the JCL command setup at the step 602, described above, the JCL commands set up at the step 622 only cause copying of data indicated by the tracking mechanism as having been modified by the host 22 during the copy operation at the step 606. That is, the only data that needs to be copied following the step 606 is data at the source storage system 24 that was modified (written) by the host 22 during the copy operation at the step 606.

Following the step 622 is a step 624 where a final copy is performed. The final copy at the step 624 copies portions of the source storage system 24 that are indicated as having been modified (written) by the host 22 during the copy operation at the step 606. Following the step 624, control transfers to a step 626 where the system switches from using the source storage system 24 to using the target storage system 24' (i.e., switches to the configuration shown in the diagram 500 of FIG. 5). Note that, following the switch, the host 22 (and possibly other hosts) access data at the target storage system 24' and the remote storage system 26 (or a separate remote storage system) provides disaster recovery for the target storage system 24'. Note also that disaster recovery is available during the entire operation both before and after the switch. Following the step 626 is a step 628 where writes by the host 22 are resumed. Following the step 628, processing is complete.

Figure 7:
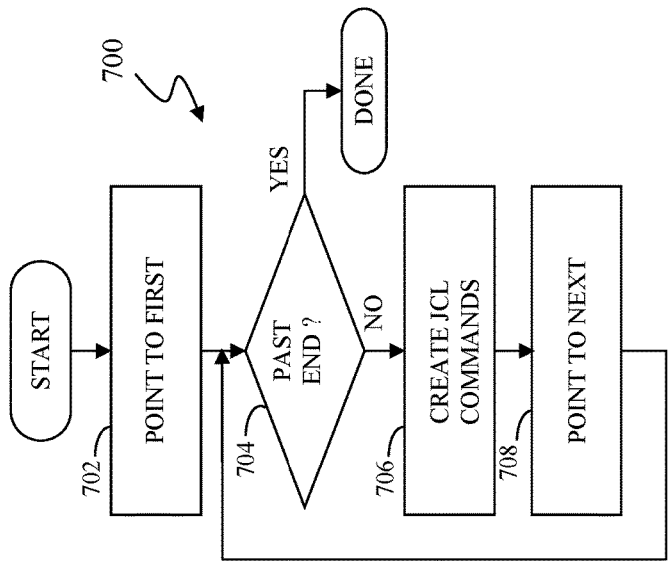
FIG. 7 is a flow diagram illustrating processing performed in connection with creating commands for selectively copying data from a source storage system to a target storage system according to an embodiment of the system described herein.

Referring to FIG. 7, a flow diagram 700 illustrates in more detail processing performed in connection with querying the write tracker and providing JCL commands to copy only portions of the source storage system 24 that were modified by the host 22 during the copy operation. Processing begins at a first step 702 to initialize an iteration pointer that iterates through all of the entries generated in connection with the write tracking mechanism (i.e., all of the entries indicating which portions of the source storage system 24 were written during the copy operation). Following the step 702 is a test step 704 where it is determined if the iteration pointer points past an end of the list of all of the written portions, which would mean that all written portions have been processed. If so, then processing is complete. Otherwise, control transfers from the test step 704 to a step 706 where a JCL command is created to copy the particular portion from the source storage system 24 to the target storage system 24'. Following the step 706 is a step 708 where the iteration pointer is incremented. Following the step 708, control transfers back to the step 704 for another iteration.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transitioning one or more host systems from using a source storage system to using a target storage system, comprising:
    resetting a write tracker on the source storage system to track writes to the source storage system by one or more host computing systems;
    copying data from the source storage system to the target storage system after resetting the write tracker;
    determining if an end condition is reached after copying the data;
    if an end condition is not reached, suspending writes by the one or more host systems, querying and resetting the write tracker while the writes are suspended, resuming the writes after querying and resetting the write tracker, and, after resuming the writes, copying data portions of the source storage system to the target storage system that are indicated as being written by the write tracker, wherein an amount of time that the writes are suspended is only an amount of time needed to query and reset the write tracker and wherein the writes by the one or more host systems to the source storage system are resumed while the data is copied from the source storage system to the target storage system; and
    if the end condition is reached, suspending the writes by the one or more host systems and then copying data portions of the source storage system to the target storage system that are indicated as being written by the write tracker, switching the one or more host systems from using the source storage system to using the target storage system after copying the data, and resuming the writes after switching the host system, wherein the one or more host systems, the source storage system, and the target storage system are separate systems that are interconnected.

2. A method, according to claim 1, wherein applications that write data to the source storage system are quiesced in connection with suspending writes to the source storage system.

3. A method, according to claim 1, wherein copying data from the source storage system uses job control language to indicate which data is to be copied.

4. A method, according to claim 1, wherein the end condition is one of: an amount of time used for copying the data or a target completion time.

5. A method, according to claim 1, wherein a remote storage system receives replicated data from the source storage system.

6. A method, according to claim 5, wherein the remote storage system receives replicated data from the target storage system after all data has been copied from the source storage system to the target storage system.

7. A method, according to claim 1, wherein data is copied using a generic copy utility that does not otherwise handle data being modified during a copy operation.

8. A method, according to claim 1, wherein at least one host of the one or more hosts is used to copy data from the source storage system to the target storage system.

9. A non-transitory computer readable medium containing software that, when executed, transitions one or more host systems from using a source storage system to using a target storage system, the software comprising:

executable code that resets a write tracker on the source storage system to track writes to the source storage system by one or more host computing systems;

executable code that copies data from the source storage system to the target storage system after resetting the write tracker;

executable code that determines if an end condition is reached after copying the data;

executable code that, if an end condition is not reached, suspends writes by the one or more host systems, queries and resets the write tracker while the writes are suspended, resumes the writes after querying and resetting the write tracker, and, after resuming the writes, copies data portions of the source storage system to the target storage system that are indicated as being written by the write tracker, wherein an amount of time that the writes are suspended is only an amount of time needed to query and reset the write tracker and wherein the writes by the one or more host systems to the source storage system are resumed while the data is copied from the source storage system to the target storage system; and executable code that, if an end condition is reached, suspends the writes by the one or more host systems and then copies data portions of the source storage system to the target storage system that are indicated as being written by the write tracker, switches the one or more host systems from using the source storage system to using the target storage system after copying the data, and resumes the writes after switching the host system, wherein the one or more host systems, the source storage system, and the target storage system are separate systems that are interconnected.

10. A non-transitory computer readable medium, according to claim 9, wherein applications that write data to the source storage system are quiesced in connection with suspending writes to the source storage system.

11. A non-transitory computer readable medium, according to claim 9, wherein copying data from the source storage system uses job control language to indicate which data is to be copied.

12. A non-transitory computer readable medium, according to claim 9, wherein the end condition is one of: an amount of time used for copying the data or a target completion time.

13. A non-transitory computer readable medium, according to claim 9, wherein a remote storage system receives replicated data from the source storage system.

14. A non-transitory computer readable medium, according to claim 13, wherein the remote storage system receives replicated data from the target storage system after all data has been copied from the source storage system to the target storage system.

15. A non-transitory computer readable medium, according to claim 9, wherein data is copied using a generic copy utility that does not otherwise handle data being modified during a copy operation.

16. A non-transitory computer readable medium, according to claim 9, wherein at least one host of the one or more hosts is used to copy data from the source storage system to the target storage system.

17. A storage transition system, comprising:

one or more host computing systems;

a source storage system coupled to the one or more host computing systems and having a write tracker that track writes to the source storage system by the one or more host computing systems;

a target storage system coupled to the one or more host computing systems; and a processor, provided in the one or more host computing systems and coupled to non-transitory computer readable medium containing software that, when executed, transitions the one or more host systems from using the source storage system to using the target storage system, the software including executable code that resets the write tracker on the source storage system to track writes to the source storage system by one or more host computing systems, executable code that copies data from the source storage system to the target storage system after resetting the write tracker, executable code that determines if an end condition is reached after copying the data, executable code that, if an end condition is not reached, suspends writes by the one or more host systems, queries and resets the write tracker while the writes are suspended, resumes the writes after querying and resetting the write tracker, and, after resuming the writes, copies data portions of the source storage system to the target storage system that are indicated as being written by the write tracker, wherein an amount of time that the writes are suspended is only an amount of time needed to query and reset the write tracker and wherein the writes by the one or more host systems to the source storage system are resumed while the data is copied from the source storage system to the target storage system, and executable code that, if an end condition is reached, suspends the writes by the one or more host systems and then copies data portions of the source storage system to the target storage system that are indicated as being written by the write tracker, switches the one or more host systems from using the source storage system to using the target storage system after copying the data, and resumes the writes after switching the host system, wherein the one or more host systems, the source storage system, and the target storage system are separate systems that are interconnected.

18. A storage transition system, according to claim 17, wherein the end condition is one of: an amount of time used for copying the data or a target completion time.

19. A storage transition system, according to claim 17, wherein a remote storage system receives replicated data from the source storage system.

20. A storage transition system, according to claim 19, wherein the remote storage system receives replicated data from the target storage system after all data has been copied from the source storage system to the target storage system.

* * * * *